United States Patent

Balsen et al.

[11] Patent Number: 5,721,398
[45] Date of Patent: Feb. 24, 1998

[54] OVERLOAD PROTECTION DEVICE FOR A PRECISION BALANCE

[75] Inventors: Franz Balsen, Gibswil; Hans-Rudolf Burkhard, Wila; Ferdinand Schneider, Dietikon, all of Switzerland

[73] Assignee: Mettler-Toledo AG, Greifensee, Switzerland

[21] Appl. No.: 521,307

[22] Filed: Aug. 30, 1995

[30] Foreign Application Priority Data

Nov. 11, 1994 [CH] Switzerland ............... 3382/94

[51] Int. Cl.$^6$ ............... G01G 21/10; G01G 23/10; G01G 23/06; G01G 3/14
[52] U.S. Cl. ............... 177/184; 177/185; 177/186; 177/187; 177/189; 177/210; 177/188; 177/229
[58] Field of Search ............... 177/184–189, 177/210 EM, 229

[56] References Cited

U.S. PATENT DOCUMENTS

| | | |
|---|---|---|
| 4,170,270 | 10/1979 | Sette et al. ............... 177/184 |
| 4,513,831 | 4/1985 | Lee et al. . |
| 5,092,416 | 3/1992 | Luechinger et al. ............... 177/229 |
| 5,096,007 | 3/1992 | Burkhard ............... 177/187 |
| 5,148,881 | 9/1992 | Leisinger ............... 177/50 |
| 5,191,948 | 3/1993 | Strickler ............... 177/188 |

Primary Examiner—Michael L. Gellner
Assistant Examiner—Anh Mai
Attorney, Agent, or Firm—Friedrich Kueffner

[57] ABSTRACT

An overload protection device for a precision balance includes a measuring cell having a short travel distance, a parallel guide unit connected to a load receiving unit, and an auxiliary parallel guide unit whose guide members are connected to the load receiving unit, on the one hand, and to a weighing dish carrier member, on the other hand, wherein the guide members of the auxiliary parallel guide unit are pretensioned by at least one spring and form a rigid unit with the load receiving unit within the loading range of the balance. The auxiliary parallel guide unit includes an upper guide member and a lower guide member, wherein the two ends of the guide members of the auxiliary parallel guide unit on the side of the weighing dish are connected to each other by at least one guide bolt fastened to the upper guide member and the lower guide member. The guide bolt extends with play through a support plate which is fixedly connected to the load receiving unit of the measuring cell. The at least one spring is mounted between the upper guide member and the support plate.

9 Claims, 3 Drawing Sheets

OVERLOAD PROTECTION DEVICE FOR A PRECISION BALANCE

BACKGROUND OF THE INVENTION

1. Field of the Invention

The present invention relates to an overload protection device for a precision balance with a measuring cell having a short travel distance, a parallel guide means connected to a load receiving means, and an auxiliary parallel guide means whose guide members are connected to the load receiving means, on the one hand, and to a weighing dish carrier member, on the other hand, wherein the guide members of the auxiliary parallel guide means are pretensioned by means of at least one spring and form a rigid unit with the load receiving means within the loading range of the balance.

2. Description of the Related Art

The mechanical elements of precision balances must be protected against overloading in order to prevent damage resulting from incorrect use of the balance. Therefore, various embodiments of overload protection devices are known in the art. Most of the known devices include a spring-elastic connection of the load receiving means and the weighing dish carrier member. The spring which connects the two components to each other permits lowering of the weighing dish carrier member as soon as the maximum load of the balance has been exceeded and prevents overloading of the weighing mechanics, particularly the measuring cell. The overload is usually supported by the cover or the bottom of the balance housing.

An overload protection device of this type is known from U.S. Pat. No. 4,273,203. In this known overload protection device, the weighing dish is connected on the weighing dish carrier member through an auxiliary parallel guide means to the load receiving means of the measuring cell. A spring presses the weighing dish carrier member against a stop of the load receiving means, so that within the loading range of the balance a rigid connection exists between the weighing dish and the load receiving means of the measuring transformer.

When the load acting on the weighing dish exceeds the measuring range of the balance, the pressing force of the spring is exceeded. The weighing dish carrier member can separate from the load receiving means and can yield downwardly until a stop fixedly connected to the housing stops this movement. During the vertical movement of the weighing dish carrier member, the force acting on the load receiving means of the measuring transformer is limited to the permissible maximum value. This known overload protection device requires a relatively large space which in many balance housing is not available or is not available to a sufficient extent.

SUMMARY OF THE INVENTION

Therefore, it is the primary object of the present invention to provide an overload protection device for precision balances which can be mounted in the smallest possible space.

In accordance with the present invention, the auxiliary parallel guide means includes an upper guide member and a lower guide member, wherein the two ends of the guide members of the auxiliary parallel guide means on the side of the weighing dish are connected to each other by means of at least one guide bolt fastened to the upper guide member and the lower guide member. The guide bolt extends with play through a support plate which is fixedly connected to the load receiving means of the measuring cell. The at least one spring is mounted between the upper guide member and the support plate.

The configuration of the overload protection device according to the present invention makes it possible to mount the device primarily laterally of the front end of the measuring cell. The auxiliary guide means which is also constructed as a parallel guide means can be equipped with guide members which are very long in relation to the travel distance of the guide members, so that low bending stresses in the bending joints are ensured. An additional support for a calibrating weight can be fastened to or intergrated with the guiding plates which contain the bending joints and are connected by the two guide bolts. The additional support for a calibrating weight can also be fastened to or integrated with the support plate. The overload protection device can be preassembled as an independent element and can be adjusted outside of the balance to the maximum load. The connection to the measuring cell is effected by means of few screws. The same structural group can be adjusted to different load ranges by replacing only the spring or springs.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
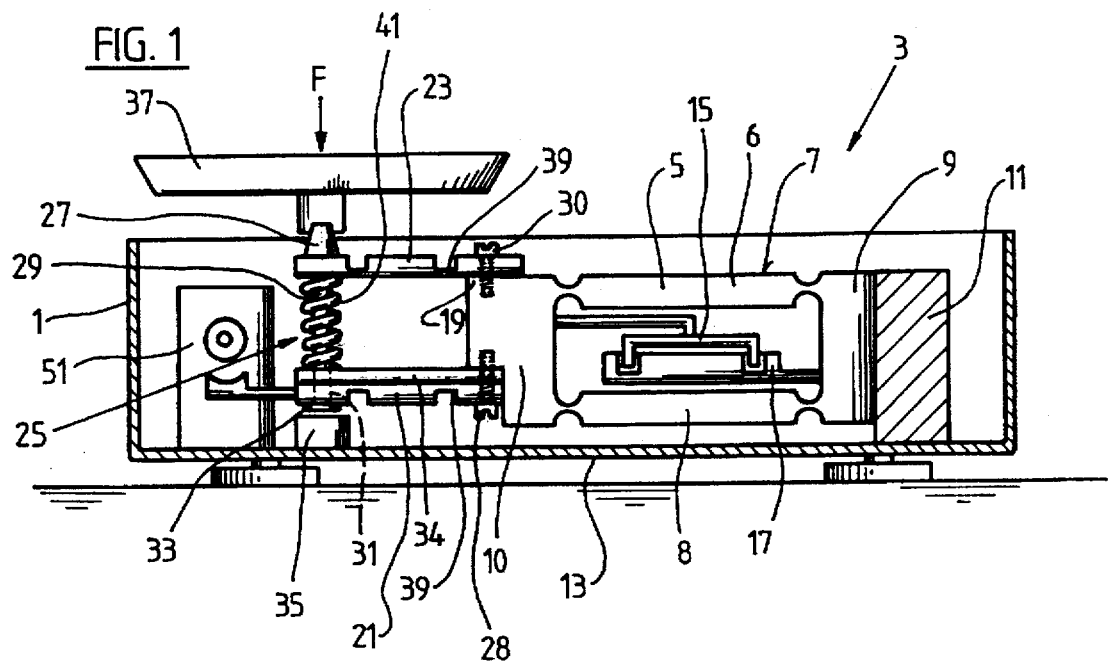
FIG. 1 is a schematic view, partially in section, of a balance with an overload protection device according to the present invention.

As illustrated in FIG. 1 of the drawing, a precision balance 3 with electromagnetic load compensation has a balance housing 1. A spring body 5 of a measuring cell 7, also called measuring transformer, is with its rearward end 9 fastened on a carrier member 11. The carrier member 11 is connected to the bottom 13 or to a wall of the balance housing 1. The spring body 5 may be manufactured, for example, from a single-piece aluminum body and may be constructed as a parallel guide means with an upper guide member 6 and a lower guide member 8 as well as a load receiving end 10 which connects the two guide members 6 and 8.

In FIG. 1, the electromagnetic load compensation is only represented schematically by a moving coil 15 and a permanent magnet 17 because the construction of the measuring cell 7 is not the subject of the invention. For the same reason, the construction of the measuring cell 7 is not explained in more detail.

A lower guide member 21 and a upper guide member 23 are fastened to the load receiving end 10 of the spring body 5 which forms the load receiving means 19. The guide members 21 and 23 together form an auxiliary parallel guide means 25. The two guide members 21 and 23 are fastened by means of a connection using screws 28 and 30 or by means of a glued or riveted connection. A weighing dish carrier member 27 supports at the top thereof a weighing dish 37. The two ends of the guide members 21 and 23 facing away from the measuring cell 7 are fixedly connected to each other by means of at least one guide bolt 29. The guide bolt 29 is fastened, for example, by means of screws, to the upper guide member 23 and the lower guide member 21. A support plate 34 is located above the lower guide member 21. The support plate 34 has a guide bore 31 through which the guide bolt 29 extends with play. As already described, the lower end of the guide bolt 29 is fixedly screwed to the lower guide member 21.

A stop 35 for limiting the pivoting movement of the auxiliary parallel guide means 25 or the vertical movement of the guide bolt 29 is arranged at a small distance, for example, a distance of a few tenths of a millimeter to several millimeters, from the head of the lower screw, not shown in FIG. 1, which secures the guide bolt 29 or from a support plate 33 fastened to the guide member 21. The two guide members 21 and 23 have bending elements which are constructed in the known manner and which effect an essentially vertical movement of the weighing dish carrier member 27. A helical spring 41 is mounted between the two guide members 21 and 23. The helical spring 41 guides the lower guide member 21 so that it contacts the support plate 34 and presses the lower guide member 21 against the support plate 34 with a predetermined load. This load corresponds to the maximum load for which the balance 3 or the measuring cell 7 is designed. The rearward end of the support plate 34 is rigidly connected to the load receiving end 10. The connection can be effected, for example, by means of the screw 28 which also serves to fasten the lower guide member 21.

When the balance 3 is loaded with a load F which is within the loading range of the balance 3, the auxiliary parallel guide means 25 acts a rigid body. The entire load F placed on the weighing dish 37 is directly transmitted to the measuring cell 7. However, when the load F exceeds the loading range of the balance 3, either because the load placed on the weighing dish 37 is too great or because a load whose size may be within the loading range of the balance drops on to the weighing dish 37, the force of the spring 41 is exceeded. The two guide members 21 and 23 bend through and the guide bolt 29 fastened to the guide members 21 and 23 presses together the spring 41 resting on the support plate 34 until the support plate 33 at the lower end of the guide bolt 29 comes into contact with the stop 35. During this process, the load acting on the measuring cell 7 is only just the permissible maximum load for which the measuring cell 7 is designed.

Figure 2:
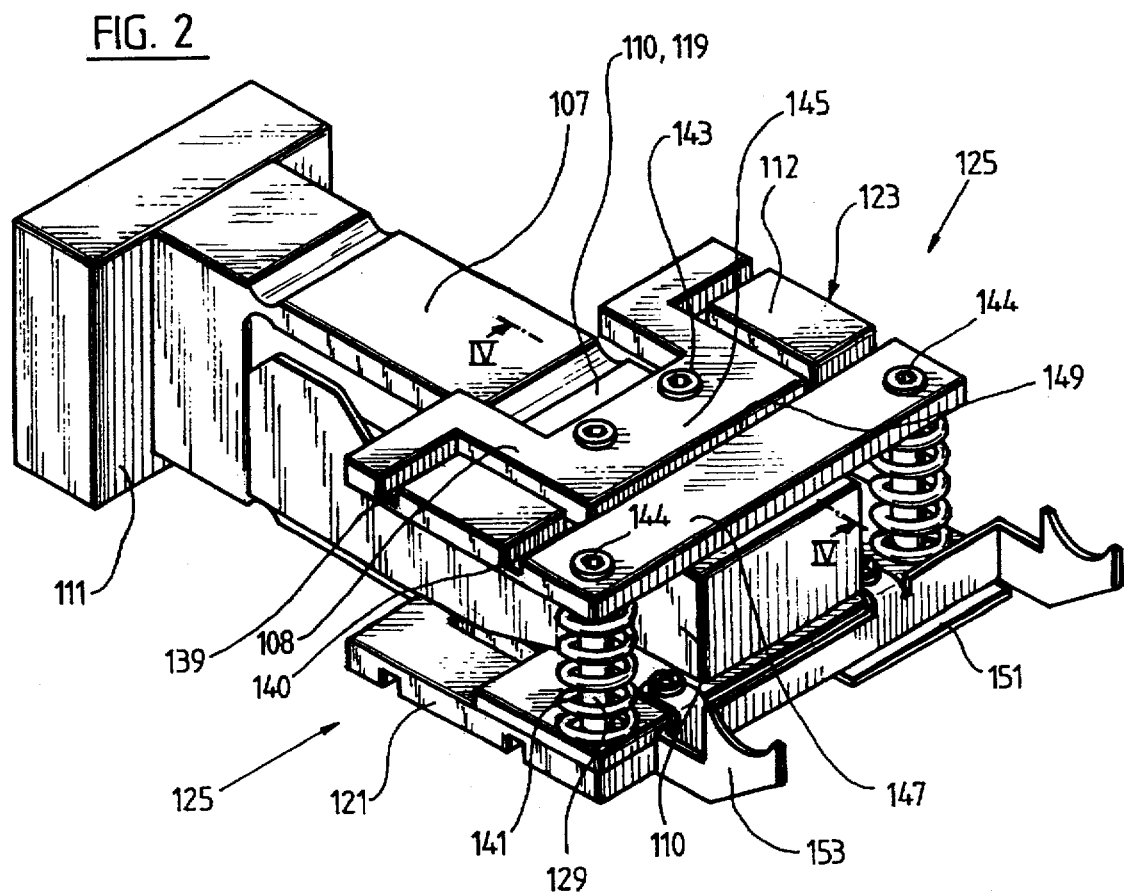
FIG. 2 is a perspective view of the measuring cell of the balance and of the overload protection device fastened to the measuring cell.
Figure 3:
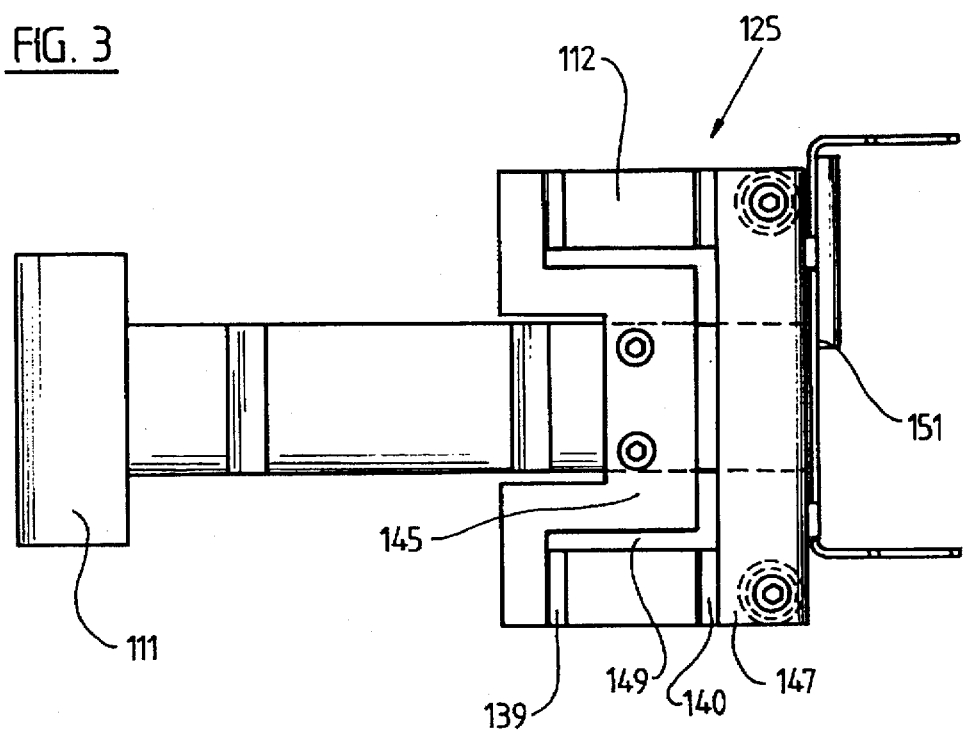
FIG. 3 is a plan view of the measuring cell of FIG. 2 and of the overload/protection device fastened to the measuring cell.
Figure 4:
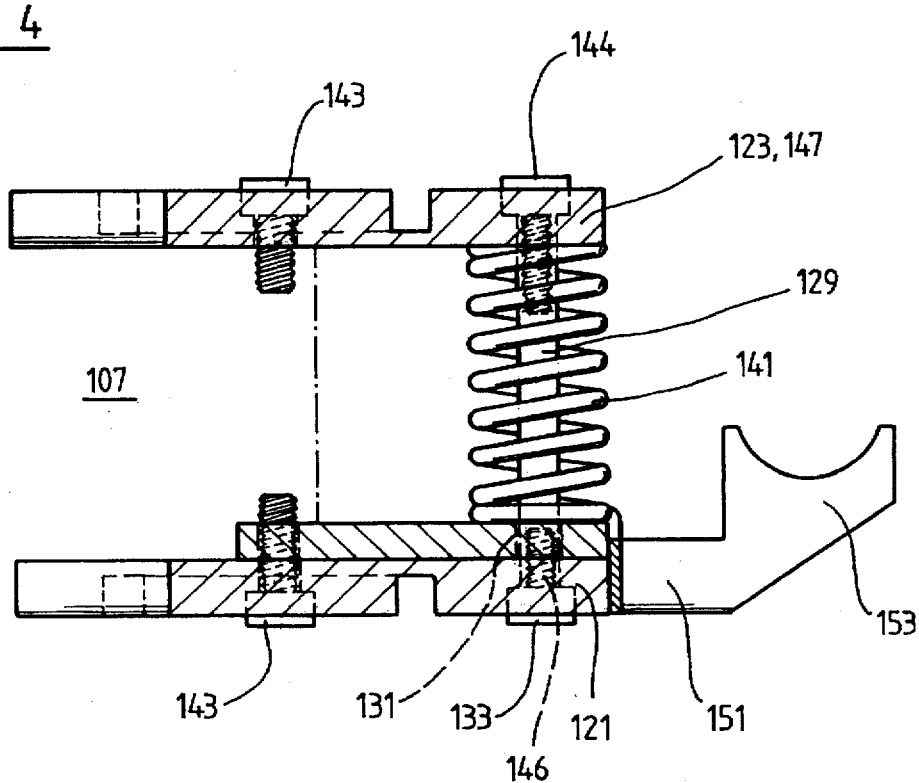
FIG. 4 is a longitudinal sectional view of the two guide members of the overload protection device taken along sectional line IV—IV of FIG. 2, wherein the load is within the loading range of the balance.

In accordance with a particularly advantageous embodiment of the invention illustrated in FIGS. 2–4, the auxiliary parallel guide means 125 surrounds the front end of the measuring cell 107 forming the load receiving means 119 and possibly other components of the measuring transformer. For clarity's sake, the balance housing and the weighing dish are not shown in FIGS. 2–4.

Also in this embodiment, the measuring cell 107 is fastened with its rearward end to a carrier member 111. Of course, another manner of fastening the measuring cell 107 would also be possible without departing from the scope of the invention. The two guide members 121 and 123 of the auxiliary parallel guide means 125 are fastened with the guide member ends 145 by means of screws 143 to the load receiving end 110 of the measuring cell 107. In contrast to the embodiment of FIG. 1, the two guide members 121, 123 do not have an elongated shape, but rather a "folded" shape. The rearward guide member ends 145 connected to the load receiving end of the measuring cell 107 have portions 108 which extend parallel to and in the direction of the rearward end of the measuring cell 107. Connected to the portions 108 are outwardly directed portions and connected to the outwardly directed portions, in turn, are forwardly directed central portions 112. The two bending elements 139 and 140 are provided on the central portions 112. The forward guide member end 147 which connects the portions 112 to each other is connected to the bending element 140 which is located further toward the front. In other words, the rearward guide member end 145 is located in a U-shaped recess 149 which is formed and surrounded by the two inner sides of the portions 112 and the forward guide member end 147.

The two guide members 121 and 123 are fastened to the measuring cell 107 above and below the load receiving end 110. The connections of the respectively forward guide member ends 147 by means of the guide bolts 129 are located laterally of the measuring cell 107.

Two helical springs 141 are placed between the forward guide member end 147 of the guide members 121 and 123 respectively. The springs 141 preferably surround the guide bolts 129 which are fastened by means of screws 144 and 146 to the upper guide member 123 and the lower guide member 121, respectively. A support plate 134 is placed on the forward portion of the lower guide member 121 and is screwed to the load receiving end 110 of the measuring cell 107. The screw connection can be effected by the lower screws 143 for fastening the lower guide members 121 to the measuring cell 107. The guide bolts 129 extend with play through guide bores 131 of the support plate 134. The helical springs 141 are mounted so as to be tensioned between the upper guide member 123 and the support plate 134. Since the two guide bolts 129 and the helical springs 141 surrounding the guide bolts 129 are located laterally outside of the load receiving means 119 of the measuring cell 107, the auxiliary parallel guide means 125 does not result in an elongation of the weighing mechanics and can be accommodated in the existing housing of the balance 3.

A calibration weight carrier member 151 with two carrier arms 153 may be fastened to the forward guide member end 147 of the lower guide member 121. For clarity's sake, the calibration weight as well as the correspondingly constructed manually or electrically operated lowering device are not illustrated in FIGS. 2–4. This device is schematically illustrated in FIG. 1 of the drawing and is denoted by reference numeral 51.

Figure 5:
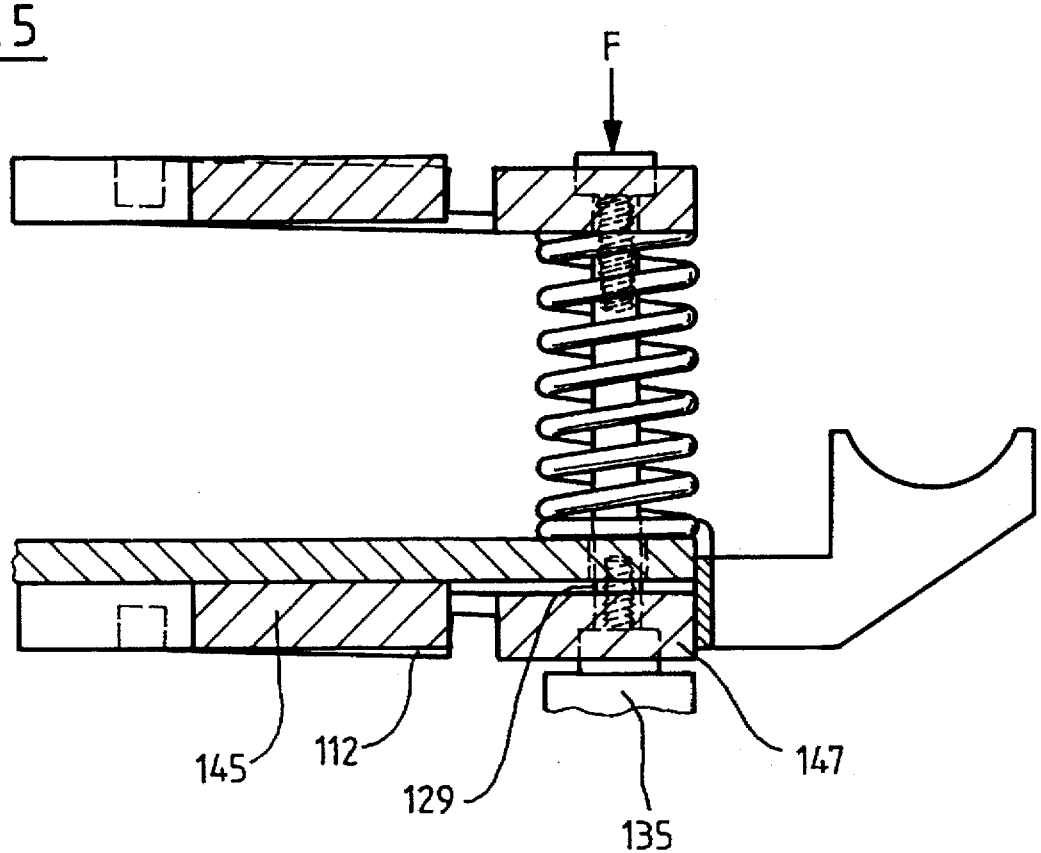
FIG. 5 is a longitudinal sectional view of the two guide members of the overload protection device taken along sectional line IV—IV of FIG. 2, wherein the load exceeds the loading range of the balance.

When an excess load is placed on the balance, the two springs 141 are pressed together and the guide members 121 and 123 are bent until the support plates 133 mounted at the bottom side of the lower guide member 121 rest against the bottom of the balance housing 1 or against a stop 134 specifically provided for this purpose. This situation is illustrated in FIG. 5 which shows the deflections of the portions 112 and of the forward guide member end 147. The positions of the rearward guide member ends 145 do not change.

The heads of the screws 146 may also serve as support plates 133.

One of the advantages of the concept of the present invention is the fact that exactly equal, i.e., exchangeable structural components can be used for the two guide members 21, 23 or 121, 123, respectively.

The invention is not limited by the embodiments described above which are presented as examples only but can be modified in various ways within the scope of protection defined by the appended patent claims.

We claim:

1. An overload protection device in a precision balance comprising a measuring cell having a short travel distance, the measuring cell comprising a load receiving means, a parallel guide means connected to the load receiving means, a weighing dish carrier member, and an auxiliary parallel guide means having upper and lower guide members each having first and second ends, the first ends of the guide members being connected to the load receiving means and the second ends of the guide members being connected to the weighing dish carrier member, at least one spring for pretensioning the guide members, wherein the guide members form together with the load receiving means a rigid unit when a load applied to the balance is within a loading range of the balance, at least one guide bolt fastened to and connecting the upper and lower guide members, a support plate fixedly connected to the load receiving means of the measuring cell, the at least one guide bolt extending with play through the support plate, wherein the at least one spring is mounted between the upper guide member and the support plate.

2. The overload protection device according to claim 1, wherein the at least one spring surrounds the at least one guide bolt.

3. The overload protection device according to claim 1, wherein the support plate rests on the lower guide member when the load applied to the balance is within the loading range of the balance.

4. The overload protection device according to claim 1, wherein the at least one spring is pretensioned between the upper and lower guide members with a force which corresponds to a maximum load of the balance.

5. The overload protection device according to claim 1, wherein the upper and lower guide members each have a portion between the first and second ends thereof, the portions having bending elements, the first ends of the guide members being connected to an end of the load receiving means of the measuring cell and the portions between the first and second ends extending laterally of the end of the load receiving means of the measuring cell.

6. The overload protection device according to claim 5, wherein the portions between the first and second ends and the second ends of the guide members each form a U-shaped recess which surrounds the first end of the guide members.

7. The overload protection device according to claim 5, wherein the at least one guide bolt connecting the guide members is located laterally outside of the measuring cell.

8. The overload protection device according to claim 1, wherein the upper and lower guide members are identical structural components.

9. The overload protection device according to claim 1, comprising a support means for a calibration weight mounted on the support plate.

* * * * *